June 17, 1952  J. G. A. M. J. MEYER  2,600,562
VARIABLE RATIO TRANSMISSION
Filed May 8, 1945  3 Sheets-Sheet 1

June 17, 1952  J. G. A. M. J. MEYER  2,600,562
VARIABLE RATIO TRANSMISSION
Filed May 8, 1945  3 Sheets-Sheet 2
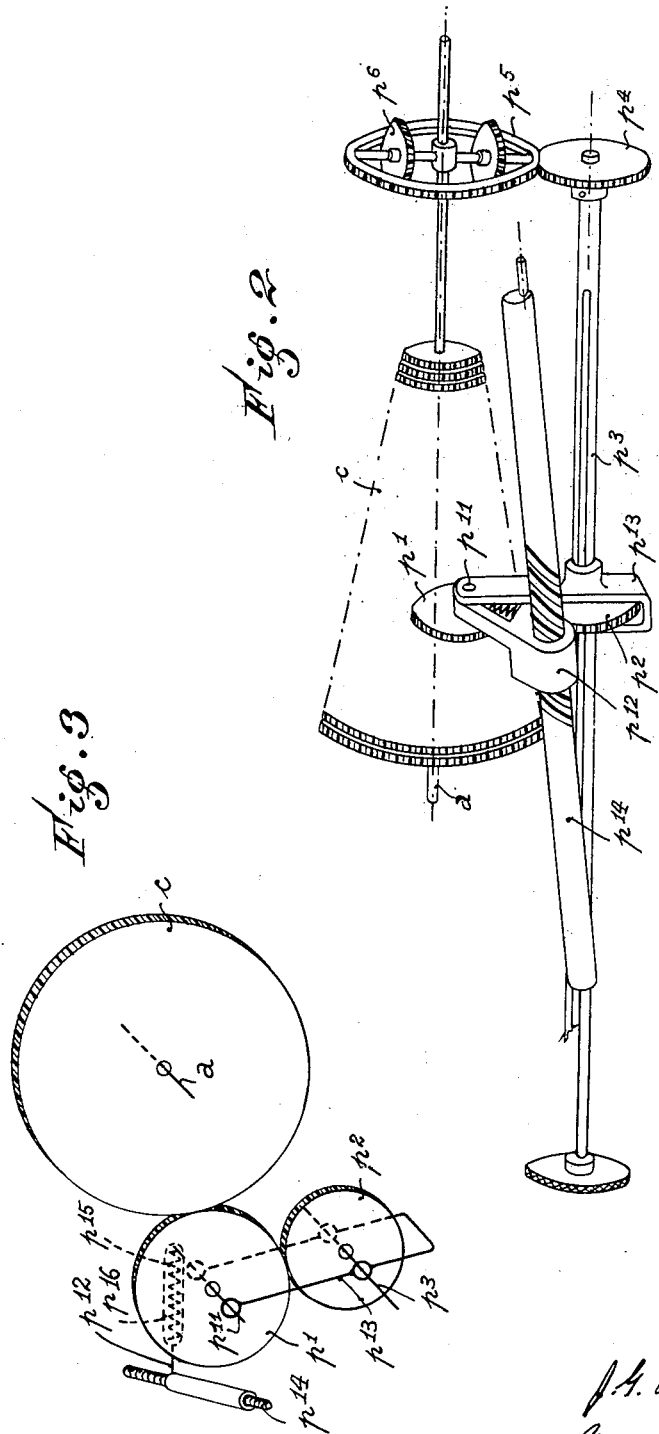

Patented June 17, 1952

2,600,562

UNITED STATES PATENT OFFICE 2,600,562

VARIABLE RATIO TRANSMISSION

Jean Gustave Antoine Marie Joseph Meyer, Neuilly-sur-Seine, France, assignor to S. A. T. A. M. Societe Anonyme pour tous Appareillages Mecaniques, La Courneuve, France Application May 8, 1945, Serial No. 592,630
In France November 5, 1942

Section 1, Public Law 690, August 8, 1946
Patent expires November 5, 1962

2 Claims. (Cl. 74—681)

The present invention relates to a variable ratio transmission comprising a driving shaft, a driven shaft, a series of at least ten pinions fixed to said driving shaft, said pinions having teeth in arithmetical progression, the largest pinion of said series having a number of teeth less than nine times the number of teeth of the smallest pinion, a plurality of idling pinions each engaging successively a pinion of said series, a plurality of differential mechanisms equal in number to said idling pinions, a constant ratio first transmission located between said first mentioned series of pinions and one of said differential mechanisms, each of said differential mechanisms comprising a first element driven either by the constant ratio first transmission or by the disengaging element of another differential mechanism, a second element for disengaging purposes driving either the first element of another differential mechanism or the driven shaft, and a third element driven by its corresponding idling pinion through the intermediary transmissions of different and variable ratios controlled by said idling pinions.

An object of the present invention is to provide such a transmission without any mechanical complications for ratios expressed by a number having several figures or digits.

With the above and other objects in view which will become apparent from the detailed description below the invention is shown in the drawings in which:

Fig. 2 is a partial perspective view showing a detail of the invention.

Fig. 3 is a perspective view showing another detail of the invention, and

The theoretical principles underlying the present invention will first be discussed.

The ratio R to be transmitted can be written:

$$R = u_1 + \frac{u_2}{10} \cdots + \frac{u_p}{10^{p-1}} \cdots + \frac{u_n}{10^{n-1}}$$

$u_1, u_2 \ldots u_p \ldots u_n$ being the number of units, each one comprising a sliding gear, the ratio of which is given by R.

In accordance with the invention there is transmitted by one of the partial transmissions not the ratio $u_1$ but the ratio $u_1 + U_1$ in which $U_1$ is a number arbitrarily chosen, by another partial transmission, not the ratio $$\frac{u_2}{10}$$

but the ratio $$u_2 = \frac{U_2 - 10U_1}{10}$$

in which $U_2$ is another number arbitrarily chosen, and so on, the last partial transmission transmitting not the ratio $u_n$ but the ratio $$\frac{u_n + U_n - 10U_{n-1}}{10^{n-1}}$$

in which $U_n$ is a number arbitrarily chosen corresponding to the last or $n^{th}$ partial transmission, $u_n$ and $U_{n-1}$ are numbers arbitrarily chosen for the figure $U_{n-1}$ of the ratio R and there is transmitted finally by the constant ratio transmission the ratio $$= \frac{U_n}{10^{n-1}}$$

If the ratios of the partial transmissions with variable ratio is added to the ratio of the transmission with constant ratio there is obtained:

$$(u_1 + U_1) + \frac{u_2 + U_2 - 10U_1}{10} + \cdots \frac{u_n + U_n - 10U_{n-1}}{10^{n-1}} - \frac{U_n}{10^{n-1}}$$

and by simplification:

$$u_1 + \frac{u_2}{10} + \cdots + \frac{u_n}{10^{n-1}}$$

that is the ratio R to be transmitted.

Figure 1:
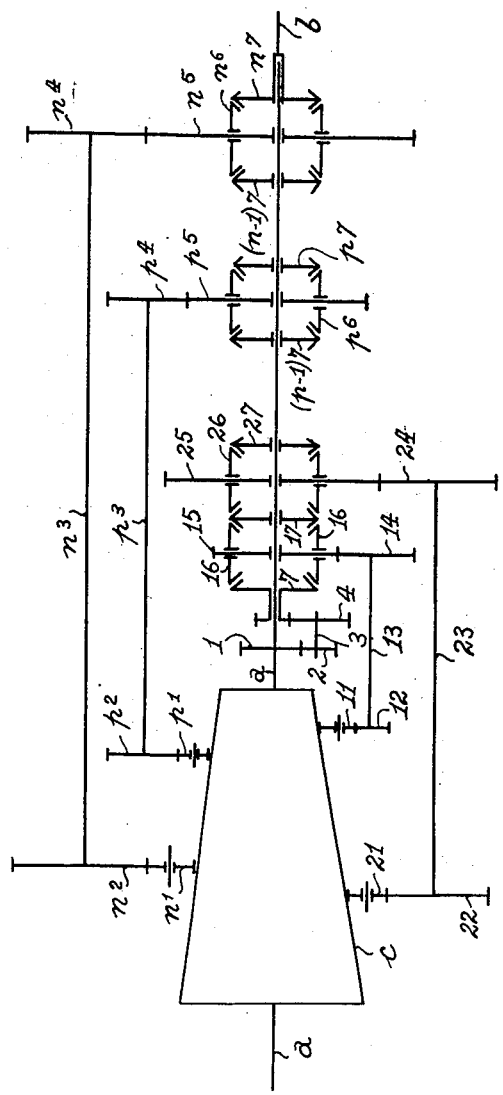
Fig. 1 is a diagrammatic view illustrating the principle of the invention.

In Fig. 1 the movement of the driving shaft $a$ is transmitted to the driven shaft $b$ through the reduction gearing 1, 2, 3, 4 through $n+1$ partial transmissions. One of these transmissions driven by the shaft $a$ of the conical cluster of gears $c$, is constituted by the system of gears 1 to 4 and actuates the sun-wheel 7 of the first differential 7, 16, 17. The reduction gearing is of constant ratio.

The other partial transmissions, to the number of $n$, are all the same. Four transmissions only have been shown. They all have a cluster gear $c$ fixed to shaft $a$ and actuated by the driving shaft $a$. In each of these transmissions the sliding gears 11, 21, ... $p_1$, ... $n_1$, drive the gears 12, 22, ... $p_2$, ... $n_2$, and, through the intermediary of transmissions of suitable ratios 12 to 14, 22 to 24, $p_2$ to $p_4$ ... $n_2$ to $n_4$, the rings 15, 25, ... $p_5$, ... $n_5$ loosely mounted on the shaft $a$ and having planet-gears 16, 26 ... $p_6$ ... $n_6$, belonging to different differentials. It may be remarked that in the first differential 7, 16, 17, the outlet sun-wheel has added the movement transmitted through the transmission 1 to 4 and the double of the movement transmitted by the sliding gear 11. In the differential 17, 26, 27, the outlet sun-wheel 27 has added the movement of the sun-wheel 17 and the double of the movement transmitted by the sliding gear 21. Therefore, upon the whole, the outlet sun-wheel 27 adds the movement transmitted through the transmission 1 to 4 and the double of the movements transmitted through the gears 11 and 21. In a general way, the movement of the sun-wheel $P_7$ of the $p^5$ differential, represents the sum of the transmission 1 to 4 and of the double of the partial transmissions controlled through the $p$ sliding gears 11, 21 ... $p_1$. At last the outlet sun-wheel $n_7$ of the last differential positively bound to the driven shaft $b$, represents the sum of the movement transmitted through the transmission 1 to 4 and of the double of the transmissions corresponding to the $n$ sliding gears 11, 21, ... $p_1$ ... $n_1$.

If there is to be transmitted, the ratio R of the following formula:

$$R = u_1 + \frac{u_2}{10} + \frac{u_3}{10^2} \cdots + \frac{u_p}{10^{p-1}} + \cdots \frac{u_n}{10^{n-1}}$$

in which $u_1$ represents the left hand figure of the number which expresses the ratio to be transmitted, $u_2$ the figure of this ratio which follows going towards the right, and so forth, $u_n$ being the last figure at the right of this ratio, the main idea which comes to mind is to transmit by each of the gear clusters one of the figures of the group forming the number which expresses the ratio to be transmitted and to bypass the transmission 1 to 4.

In that case it will be necessary that the sliding gear 11 should find in the cluster of gears $c$, several gears whose numbers of teeth are to each other as the number obtained from the foregoing formula for the ratio R. In the same way, the sliding gear 21 must be able to engage with several of the gears of the cluster $c$ whose number of teeth are to each other as the number taken from the foregoing formula for the ratio R. It is the same for the sliding gears 31 ... $p_1$ ... and $n_1$.

Therefore it will be necessary to find in the cluster $c$ several gears whose numbers of teeth are to each other as 1, 2 and 9, that is to say, in practice, that the diameters of the extreme gears will be to each other at least as 1 is to 9, since each sliding gear 11 ... $p_1$ ... $n_1$ must be able to engage with one of the gears of the cluster $c$ and consequently since all the gears of the cluster $c$ and the sliding gears 11, 21, ... $p_1$ ... $n_1$ must have the same module (that is to say the same spacing of teeth). The gears of the cluster having a thickness relatively small, the cone which envelopes the cluster $c$ will have a very large summit angle, which is not suitable in the kind of transmissions to which the present invention relates. It is recalled, in fact, as it can be seen on Figures 2 and 3 that the sliding gear $p_1$ is mounted on a shaft $p_{11}$ which is supported by a simple stirrup $p_{13}$, swinging about the shaft $p_3$ and keeping engaged the gear $p_1$ with the gear pinion $p_2$, slidingly keyed on the shaft $p_3$. The axes $p_{11}$ and $p_3$ are parallel to the axis of shaft $a$ of the cluster $c$. The part $p_{12}$ is constituted by a simple link and forms a nut on the control shaft $p_{14}$ which is parallel to one of the generatrix of the enveloping surface of the cluster $c$. The axis $p_{11}$ passes through the loop $p_{16}$ of the part $p_{12}$ and a spring $p_{15}$ supported at one end of the loop $p_{16}$ and at its other end upon the axis $p_{11}$ of the gear $p_1$ tends to push the gear $p_1$ against the cluster $c$. It is obvious that if the angle between the axes $p_3$ and $p_{14}$ is too great, the movements given by the rotation of the threaded rod $p_{14}$ would have too great an inclination with relation to the movements of the jaw $p_{13}$, which is obliged to rotate around $p_3$ and jamming will occur.

The spacing between the axis of the sliding gear and the one of the corresponding gear of the cluster $c$ is obtained through the parallelism of the control screw $p_{14}$ and of a generatrix of the enveloping cone of the cluster $c$. The parallelism is modified according to the inclination of the jaw $p_{12}$, which depends on the inclination of the jaw $p_{13}$ which becomes necessarily important if the angle of the cone is important.

The movement of $p_{12}$ forces the sliding gear $p_1$ to a trajectory which in horizontal projection is approximately a sinusoid. The angle that it forms with the plane of the gears of the cluster $c$ cannot increase beyond a certain size, otherwise the disengaging of the sliding gear $p_1$ cannot be realized without penetration into the teeth of the other pinions of the cluster $c$ except in taking for these a spacing lengthening out the cone in an inadmissible way.

These disadvantages are eliminated by the present invention.

Figure 4:
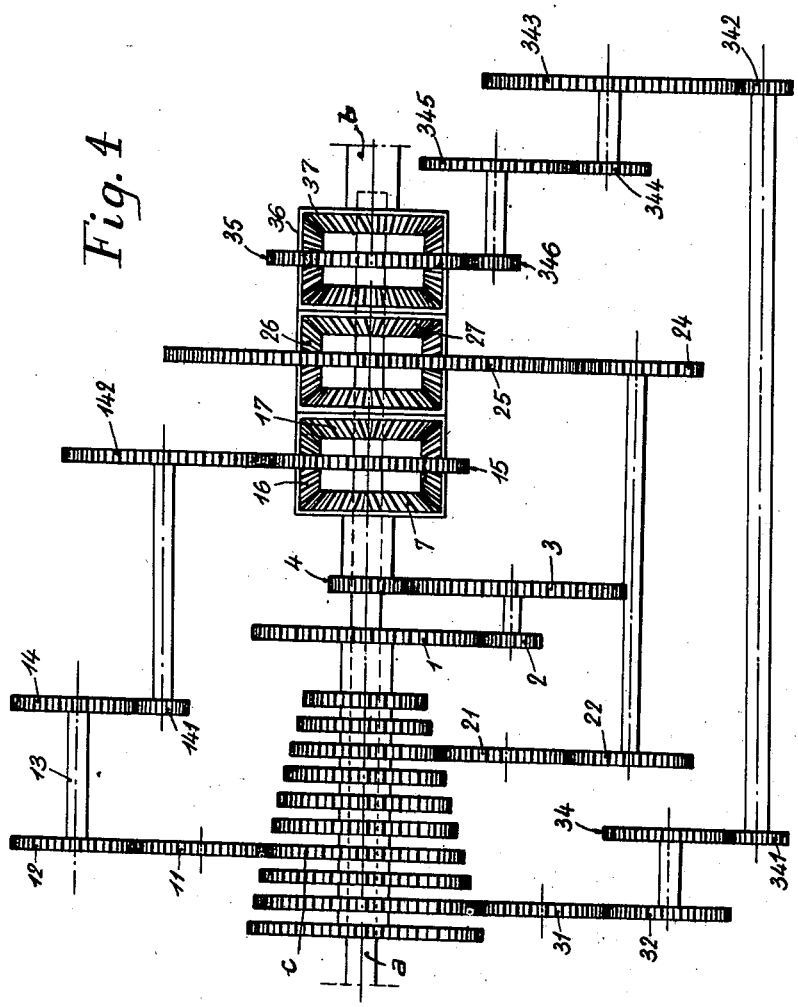
Fig. 4 is a plan view of an apparatus embodying the invention.

The invention will be further described with reference to an apparatus embodying the invention as shown in Fig. 4.

In the apparatus shown in Figure 4 upon the shaft $a$ are fixedly mounted ten gears having respectively 10, 11, 12 ... 18 and 19 teeth and forming the cluster $c$. Upon the shaft $a$ adjacent this cluster there is fixedly mounted another gear 1, having 37 teeth and which meshes with a double gear 2, 3, having respectively 10 and 30 teeth and which are mounted loosely upon a shaft parallel to the shaft $a$. The gear 3 meshes with a gear 4 having 10 teeth and which is mounted loosely upon the shaft $a$ and is integral with the sun-wheel 7 of a differential 7, 16, 17. The ratio of the transmission formed by the gears 1 to 4 is therefore equal to:

$$\left(-\frac{37}{10}\right) \times \left(-\frac{30}{10}\right) = +11.1$$

A first tumbler gear 11, having 10 teeth is capable of meshing with any of the gears of the cluster $c$ having from 10 to 19 teeth, and drives a double gear 12, 14, having respectively 10 and 25 teeth, disposed upon the shaft 13. The gear 14, through the intermediary of a double transmitting gear 141, 142, having respectively 10 and 20 teeth, drives a gear 15 which has ten teeth and is mounted loosely upon the shaft $a$. The axles of the planet-wheels of the differential 7, 16 and 17, are disposed upon the gear 15.

Under these conditions the sun-wheel 7 makes +11.1 revolutions for every revolution of the shaft $a$, and the gear 15 makes $$\left(-\frac{n_1}{10}\right)\left(-\frac{10}{10}\right)\left(-\frac{25}{10}\right)\left(-\frac{20}{10}\right) = +\frac{n_1}{2}$$

revolutions about the shaft $a$ ($n_1$ being the number of teeth of the gear of the cluster with which the moving gear 11 engages). Under these conditions the output sun-wheel 17 makes:

$$2 \times \frac{n_1}{2} - 11.1$$

revolutions for each revolution of shaft $a$.

A second tumbler gear 21, having 10 teeth, is capable of being engaged with any of the gears of the cluster $c$, having from 10 to 19 teeth, and drives through the gear 21, which has 10 teeth, a double gear 22, 24. The gear 24 has 10 teeth and engages with a gear 25 which has 20 teeth and is mounted loosely upon the shaft $a$. The axles of the planet-wheels 26 of the differential 17, 26, 27, are disposed upon the gear 15.

Under these conditions the sun-wheel 17 makes $$2 \times \frac{n_1}{2} - 11.1$$

revolutions for each revolution of the shaft $a$ and the gear 25 makes:

$$\left(-\frac{n_2}{10}\right)\left(-\frac{10}{10}\right)\left(-\frac{10}{20}\right) = -\frac{n_2}{20}$$

revolutions ($n_2$ being the number of teeth of the gear of the train with which the moving gear 21 engages).

Under these conditions the output sun-wheel 27 will make:

$$-2\frac{n_2}{20} - 2\frac{n_1}{2} + 11.1$$

revolutions.

A third tumbler gear 31, having 10 teeth, is capable of being meshed with any of the gears of the cluster $c$ having from 10 to 19 teeth. The gear 31 meshes with a gear 32 having 10 teeth and which is connected to a gear 34 having 20 teeth.

The gear 34 engages with a gear 341 having 10 teeth and which is adapted to rotate a gear 342 having 10 teeth. The latter engages with a gear 343 having 50 teeth and connected to a gear 344 having 10 teeth. The gear 344 engages with a gear 345 having 20 teeth and connected to a gear 346 having 10 teeth. The last named gear engages with a gear 35 having 40 teeth and which is mounted loosely upon the shaft $a$. The axles of the planet-wheels 36 of a differential 27, 36, 37, are disposed upon the gear 35.

Under these conditions for each revolution of the shaft $a$ the sun-wheel 27 makes $$-2\frac{n_2}{20} - 2\frac{n_1}{2} + 11.1$$

revolutions and the gear 35 makes $$\left(-\frac{n_3}{10}\right)\left(-\frac{10}{10}\right)\left(-\frac{20}{10}\right)\left(-\frac{10}{50}\right)\left(-\frac{10}{20}\right)\left(-\frac{10}{40}\right) = +\frac{n_3}{200}$$

revolutions ($n_3$ being the number of teeth of the gear of the train $c$ with which the moving gear 31 engages), the output sun-wheel 37 which drives the output shaft $b$ will make:

$$2\frac{n_3}{200} - \left(-2\frac{n_2}{20} - 2\frac{n_1}{2} + 11.1\right) = \frac{n_3}{100} + \frac{n_2}{10} + \frac{n_1}{1} - 11.1$$

revolutions.

If a numerical example is taken: $n_1 = 16$, $n_2 = 12$, $n_3 = 13$, it is seen that the shaft $b$ makes 6.28 revolutions for each revolution of the shaft $a$.

With this apparatus, it is possible to transmit very different ratios. In fact, if the minimum values are taken of $n_1$, $n_2$, and $n_3$, then $$n_1 = n_2 = n_3 = 10$$

and the total ratio will be 0.

On the contrary, if the highest values are taken for $n_1$, $n_2$ and $n_3$, that is to say, $n_1 = n_2 = n_3 = 19$, the total ratio will be 9.99.

It is therefore seen that the ratios which can be transmitted with the three sliding gears will range between 0 and 9.99.

I claim:

1. A variable ratio transmission comprising a driving shaft, a driven shaft, a series of at least ten pinions fixed to said driving shaft, said pinions having teeth in arithmetical progression, the largest pinion of said series having a number of teeth less than nine times the number of teeth of the smallest pinion, a plurality of idling pinions each engaging successively a pinion of said first series, a plurality of differential mechanisms equal in number to said idling pinions, a constant ratio first transmission located between said first mentioned series of pinions and one of said differential mechanisms, each of the said differential mechanisms having a first element as an admission element, a second element as an outlet element, and a third element connected to and controlled by said idling pinions at variable and different rates, the first element of the first of the differential mechanisms being controlled by the first transmission at constant rate, whereas the first element of each of the other differential mechanisms is controlled by the outlet element of a differential mechanism different from the one to which it belongs, the second element of the third of the differential mechanisms driving the driven shaft, whereas each of the second elements of the other differential mechanisms drives the first element of a differential mechanism different from the one to which it belongs.

2. An apparatus for the transmission of different ratios comprising a frame, a driving shaft mounted upon said frame, a driven shaft mounted upon said frame, a series of at least ten pinions fixed upon said driving shaft, said pinions having a number of teeth in arithmetical progression, the pinion of largest diameter having a number of teeth less than nine times the number of teeth of the pinion with the smallest diameter, a plurality of idling pinions each engaging successively a pinion of said series, a plurality of differential mechanisms equal in number to said idling pinions, a first transmission of constant ratio driven by said driving shaft and located between said series of pinions and one of said differential mechanisms, a second transmission of constant ratio interposed between an idling pinion, the corresponding differential mechanism, and driven by said idling pinion, a control shaft for each of said idling pinions parallel to one of the generatrices of the cone formed by said series of pinions and mounted upon said frame, each of the said differential mechanisms having a first element as an admission element, a second element as an outlet element, and a third element connected to and controlled by said idling pinions at variable and different rates, the first element of the first of the differential mechanisms being controlled by the first transmission at constant rate, whereas the first element of each of the other differential mechanisms is controlled by the outlet element of a differential mechanism different from the one to which it belongs, the second element of the third of the differential mechanisms driving the driven shaft, whereas each of the second elements of the other differential mechanisms drives the first element of a differential mechanism different from the one to which it belongs.

JEAN GUSTAVE ANTOINE
MARIE JOSEPH MEYER.

(References on following page)

REFERENCES CITED

The following references are of record in the file of this patent:

UNITED STATES PATENTS

| Number | Name | Date |
|---|---|---|
| 1,606,869 | Christophel | Nov. 16, 1926 |
| 1,662,688 | Veber | Mar. 13, 1928 |
| 2,111,996 | Slye | Mar. 22, 1938 |
| 2,196,806 | Berck | Apr. 9, 1940 |

FOREIGN PATENTS

| Number | Country | Date |
|---|---|---|
| 358,421 | France | May 15, 1906 |
| 842,413 | France | June 12, 1939 |
| 336,263 | Germany | May 23, 1921 |